United States Patent
Baba et al.

(10) Patent No.: US 9,793,769 B2
(45) Date of Patent: Oct. 17, 2017

(54) INTERIOR PERMANENT MAGNET MOTOR, AND COMPRESSOR

(71) Applicants: Kazuhiko Baba, Tokyo (JP); Koji Yabe, Tokyo (JP); Tomoaki Oikawa, Tokyo (JP)

(72) Inventors: Kazuhiko Baba, Tokyo (JP); Koji Yabe, Tokyo (JP); Tomoaki Oikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 14/773,462

(22) PCT Filed: Mar. 14, 2013

(86) PCT No.: PCT/JP2013/057171
§ 371 (c)(1),
(2) Date: Sep. 8, 2015

(87) PCT Pub. No.: WO2014/141428
PCT Pub. Date: Sep. 18, 2014

(65) Prior Publication Data
US 2016/0028278 A1  Jan. 28, 2016

(51) Int. Cl.
*H02K 21/12* (2006.01)
*H02K 1/27* (2006.01)

(52) U.S. Cl.
CPC .................................. *H02K 1/276* (2013.01)

(58) Field of Classification Search
CPC .. H02K 1/276; H02K 1/2766; H02K 2213/03; H02K 15/03

(Continued)

(56) References Cited

U.S. PATENT DOCUMENTS 7,868,502 B2 * 1/2011 Lee .................. H02K 1/276
310/156.48
8,853,909 B2 * 10/2014 Aota .................. H02K 1/276
310/156.53

(Continued)

FOREIGN PATENT DOCUMENTS

JP  2001-115963 A  4/2001
JP  2004-254396 A  9/2004

(Continued)

OTHER PUBLICATIONS

English translation of Office Action dated Feb. 28, 2017 issued in the corresponding CN application No. 2013800745060.

(Continued)

*Primary Examiner* — Thanh Lam
(74) *Attorney, Agent, or Firm* — Posz Law Group, PLC

(57) ABSTRACT

Provided is an interior permanent magnet motor, including: a plurality of permanent magnets respectively inserted into a plurality of magnet accommodating holes formed in a rotator core of a rotator. In the magnet accommodating hole, a pair of minute projecting portions, a pair of large projecting portions, and a pair of demagnetizing field recesses are formed. The permanent magnet is sandwiched by a corresponding pair of minute projecting portions. The minute projecting portion is protruded radially inward to be in surface-contact with a corresponding end surface of the permanent magnet. The large projecting portion is formed on an outer side of the minute projecting portion, and is extended to an inner defining line side of the magnet accommodating hole. A height dimension (Ta) of the large projecting portion is larger than a height dimension (Tb) of the minute projecting portion.

7 Claims, 10 Drawing Sheets

(58) Field of Classification Search
USPC ........................................ 310/156.01–156.83
See application file for complete search history.

(56) References Cited

U.S. PATENT DOCUMENTS

| | | | | |
|---|---|---|---|---|
| 8,937,420 | B2* | 1/2015 | Yabe ...................... | H02K 1/276 310/156.53 |
| 2002/0145353 | A1* | 10/2002 | Kimura .................. | H02K 1/276 310/156.57 |
| 2002/0171309 | A1* | 11/2002 | Wakui ................... | H02K 1/2766 310/156.48 |
| 2004/0041486 | A1* | 3/2004 | Gary ...................... | H02K 1/276 310/156.57 |
| 2007/0222319 | A1 | 9/2007 | Yoshikawa et al. | |
| 2008/0224558 | A1* | 9/2008 | Ionel .................... | H02K 1/2766 310/156.57 |
| 2012/0293033 | A1 | 11/2012 | Hisada | |
| 2015/0256038 | A1* | 9/2015 | Nigo ...................... | H02K 1/276 62/498 |

FOREIGN PATENT DOCUMENTS

| | | |
|---|---|---|
| JP | 2007-159281 A | 6/2007 |
| JP | 2008-148391 A | 6/2008 |
| JP | 2008-278591 A | 11/2008 |
| JP | 2009-247131 A | 10/2009 |
| JP | 2012-210040 A | 10/2012 |
| JP | 2012-244765 A | 12/2012 |

OTHER PUBLICATIONS

International Search Report of the International Searching Authority dated May 28, 2013 for the corresponding international application No. PCT/JP2013/057171(and English translation).

* cited by examiner

INTERIOR PERMANENT MAGNET MOTOR, AND COMPRESSOR

CROSS REFERENCE TO RELATED APPLICATION

This application is a U.S. national stage application of PCT/JP2013/057171 filed on Mar. 14, 2013, the content of which is incorporated herein by reference.

TECHNICAL FIELD

The present invention relates to an interior permanent magnet motor having a permanent magnet embedded in a rotator core, and a compressor including the same.

BACKGROUND ART

In recent years, due to an increasing interest in energy saving, there have been proposed many types of permanent magnet motors each of which uses a Nd.Fe.B rare-earth permanent magnet having a high residual flux density as a rotator, to thereby realize high efficiency.

In particular, as an electric motor for a compressor to be used in refrigeration equipment or air-conditioning equipment, an interior permanent magnet motor having a permanent magnet embedded in a rotator core is often used. In the rotator core, a plurality of magnet accommodating holes for embedding a plurality of permanent magnets are formed. For those magnet accommodating holes, in order to suppress a short-circuit flux of the permanent magnet when the magnet is embedded, space portions called flux barriers are formed at both end portions of the magnet accommodating hole in a longitudinal direction thereof. Moreover, for the magnet inserting holes, position determination projecting portions for determining an arrangement position of the magnet are formed. In the structure, the projecting portions are in surface-contact with the magnet at the both end portions of the magnet in a longitudinal direction thereof.

For example, a rotator of an interior permanent magnet motor disclosed in Patent Literature 1 includes a rotator core that has a plurality of hole portions for housing permanent magnets and is formed by laminating thin iron sheets with high magnetic permeability, and a plurality of permanent magnets housed and held in the hole portions, in which protrusions for punching are formed at both ends of the hole portions so that the rotator core and the permanent magnets are in surface-contact with each other, to thereby fix the permanent magnets.

A rotator of an interior permanent magnet motor disclosed in Patent Literature 2 includes a plurality of magnet inserting holes, permanent magnets inserted into the magnet inserting holes at approximately the center thereof, and demagnetization suppressing projecting portions. Each of the magnet inserting holes is formed along an outer peripheral edge of a rotator core. Between both end portions of the magnet inserting hole on the outer peripheral side and the outer peripheral edge of the rotator core, there are formed outer peripheral thin portions each having a predetermined radial dimension. In space in the both end portions of the magnet inserting hole into which the permanent magnet is not inserted, the demagnetization suppressing projecting portions are protruded from the outer peripheral side or the inner peripheral side of the magnet inserting hole at positions apart from the permanent magnet by a predetermined distance. Further, in the configuration, the shortest distance between the demagnetization suppressing projecting portion and the magnet inserting hole is smaller than a width of the magnet inserting hole in a radial direction thereof.

In a rotator of an interior permanent magnet motor disclosed in Patent Literature 3, in an outer diameter-side end portion of a magnet inserting hole on the inter-pole core portion side, a first magnet retaining portion protruding radially inward is formed, and in an outer diameter-side end portion of the magnet inserting hole on the inter-magnet inserting hole core portion side, a second magnet retaining portion protruding radially inward is formed.

Moreover, in some of the related-art electric motors, in order to operate an electric motor in a high temperature atmosphere of a compressor, much dysprosium (Dy) is added to increase J coercive force so that a rare-earth magnet is prevented from being demagnetized at high temperature. In particular, when an R32 coolant having a small global warming potential (GWP) is used, as compared to using a related-art 410A coolant, the temperature of the compressor is increased by 10° C. or more, and hence the addition amount of Dy is increased to increase the J coercive force.

For example, in a compressor disclosed in Patent Literature 4, a brushless DC motor and a compressor main body are concentrically arranged in a hermetically-sealed casing, a simple R32 coolant or an R32 rich mixed coolant is employed as a coolant to be taken, compressed, and discharged by the compressor main body, and J coercive force of a rare-earth magnet is set to 23 kOe or more.

CITATION LIST

Patent Literature

[PTL 1] JP 2007-159281 A (see mainly FIG. 2)
[PTL 2] JP 2012-210040 A (see mainly FIG. 10)
[PTL 3] JP 2009-247131 A (see mainly FIG. 1)
[PTL 4] JP 2001-115963 A (see mainly FIG. 12)

SUMMARY OF INVENTION

Technical Problem

However, in the above-mentioned interior permanent magnet motor disclosed in Patent Literature 1, when a demagnetizing field generated by a winding of the stator (a magnetic flux in a direction opposite to that of a magnetic flux generated by the permanent magnet) is applied to the rotator, because magnetic permeability of the magnet is substantially equal to that of air and the magnetic flux is difficult to pass therethrough, the magnetic flux tends to flow in a direction in which a magnetic resistance is small. In this case, the demagnetizing field passes from the vicinity of a corner portion on the magnet outer peripheral side, at which the space distance is the smallest, to the surface-contact portion of a side surface of the magnet in a concentrated manner. Thus, there is a problem in that the vicinity of the corner portion on the magnet outer peripheral side is demagnetized, resulting in a reduction in torque.

Moreover, in the configuration of the above-mentioned interior permanent magnet motor disclosed in Patent Literature 2, the shortest distance between the demagnetization suppressing projecting portion and the magnet inserting hole is smaller than the width of the magnet inserting hole in the radial direction, and hence a demagnetizing field flows from the demagnetization suppressing projecting portion to a magnet fixing projecting portion. In this case, there is a problem in that the vicinity of a corner portion of the magnet adjacent to the magnet fixing projecting portion is demagnetized, resulting in a reduction in torque.

Moreover, in the configuration of the above-mentioned interior permanent magnet motor disclosed in Patent Literature 3, when the permanent magnet is divided on the inner diameter side and on the outer diameter side, a surface area on which the permanent magnet and the magnet inserting hole can be in contact with each other is wider on the outer diameter side than on the inner diameter side, and hence a demagnetizing field flows to the inner diameter side of the magnet inserting hole via the vicinity of a corner portion of the magnet on the outer diameter side. Thus, there is a problem in that the vicinity of the corner portion of the magnet on the outer diameter side is demagnetized, resulting in a reduction in torque.

Further, in the above-mentioned compressor disclosed in Patent Literature 4, R32 is used as the coolant and the J coercive force is set to 23 kOe or more in order to ensure the demagnetization resistance of the magnet, and hence dysprosium (Dy) added to the rare-earth magnet is increased to increase the cost. Moreover, much Dy is added and a residual flux density (Br) of the magnet is thus reduced, resulting in a reduction in efficiency.

The present invention has been made in view of the foregoing, and has an object to provide an interior permanent magnet motor in which a demagnetization resistance of the vicinity of a corner portion of a magnet is improved while the magnet is reliably positioned.

Solution to Problem

In order to achieve the above-mentioned object, according to one embodiment of the present invention, there is provided an interior permanent magnet motor, including: a rotator; a stator arranged so as to be opposed to the rotator across an air gap; and a plurality of permanent magnets respectively inserted into a plurality of magnet accommodating holes formed in a rotator core of the rotator, in which at both ends of an outer defining line of each of the magnet accommodating holes, a pair of minute projecting portions, a pair of large projecting portions, and a pair of demagnetizing field recesses are formed, in which each of the permanent magnets is arranged so as to be sandwiched by a corresponding pair of minute projecting portions, in which each of the minute projecting portions is protruded radially inward to be in surface-contact with a corresponding end surface of the permanent magnet inserted into the magnet accommodating hole, in which each of the large projecting portions is formed on an outer side of a corresponding minute projecting portion, and is extended to an inner defining line side of the magnet accommodating hole, and in which the large projecting portions and the minute projecting portions are formed so that Tb<Ta is established, where Ta represents a height dimension of the large projecting portion and Tb represents a height dimension of the minute projecting portion.

Advantageous Effects of Invention

According to the one embodiment of the present invention, an interior permanent magnet motor in which a demagnetization resistance of the vicinity of a corner portion of a magnet is improved while the magnet is reliably positioned may be obtained.

DESCRIPTION OF EMBODIMENTS

Figure 1:
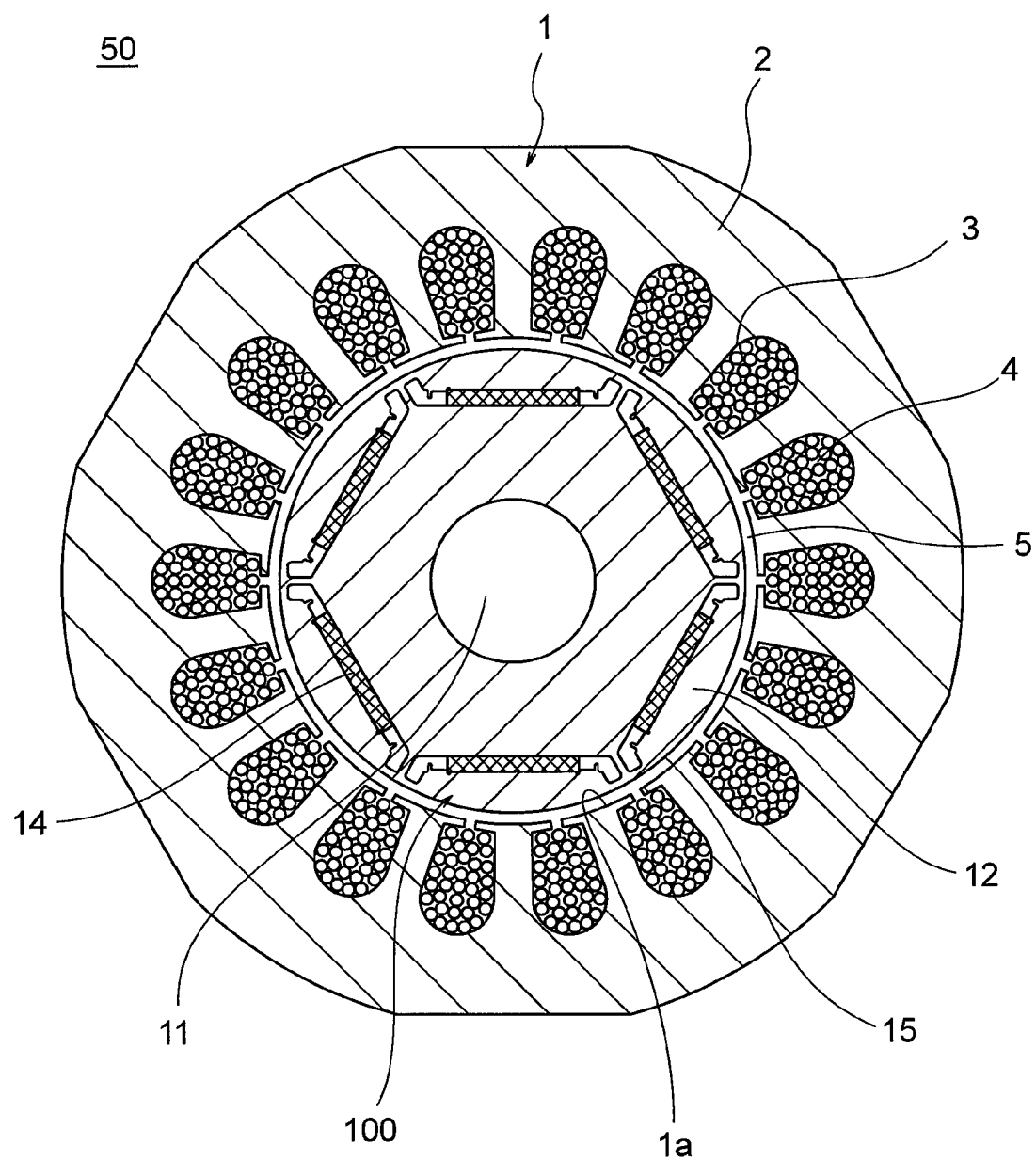
FIG. 1 is a cross-sectional view of an interior permanent magnet motor according to a first embodiment of the present invention.

Now, an interior permanent magnet motor according to embodiments of the present invention is described with reference to the accompanying drawings. Note that, in the drawings, the same reference symbols represent the same or corresponding parts.

First Embodiment

Figure 2:
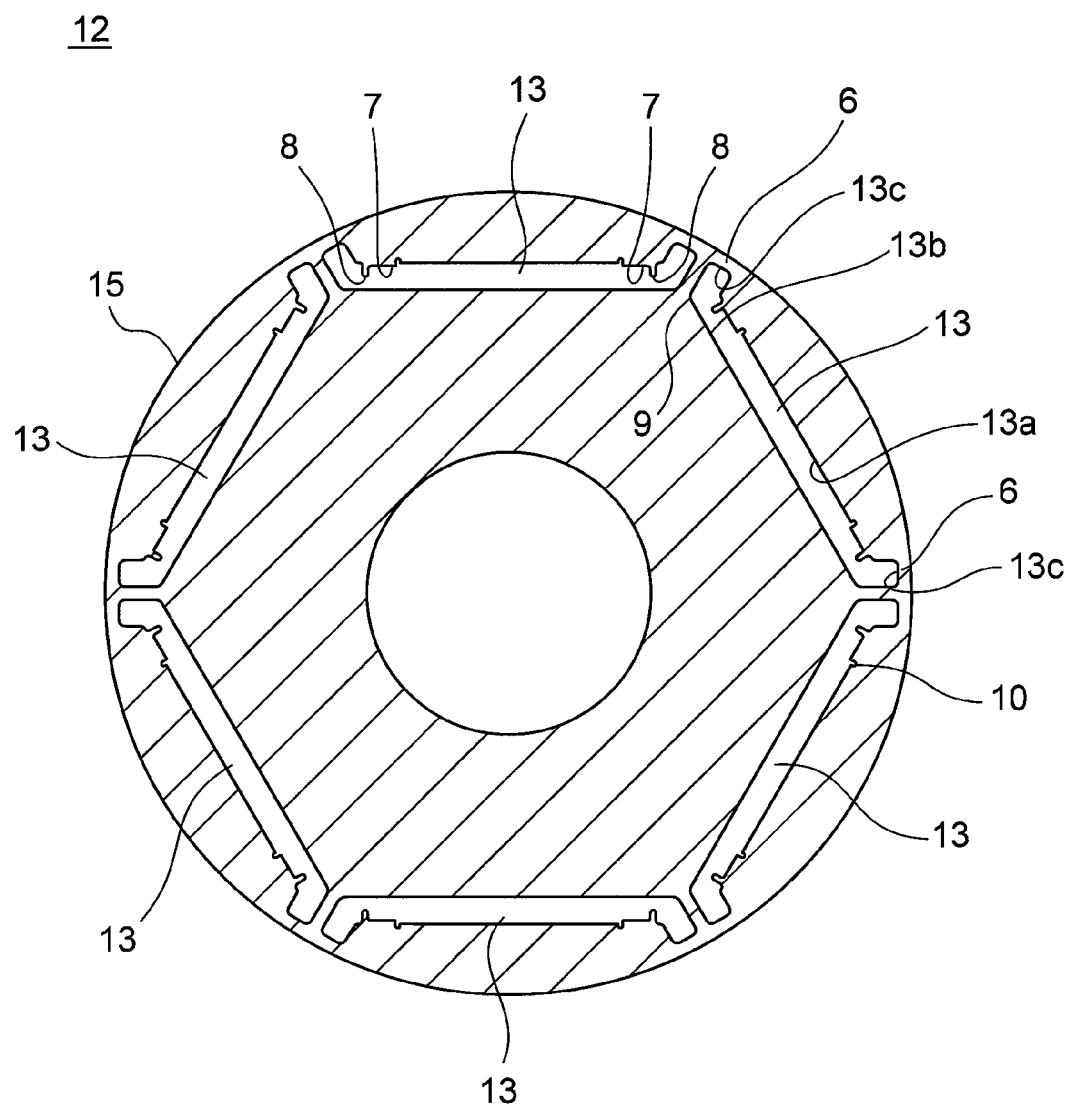
FIG. 2 is a cross-sectional view of a rotator core illustrated in FIG. 1.
Figure 3:
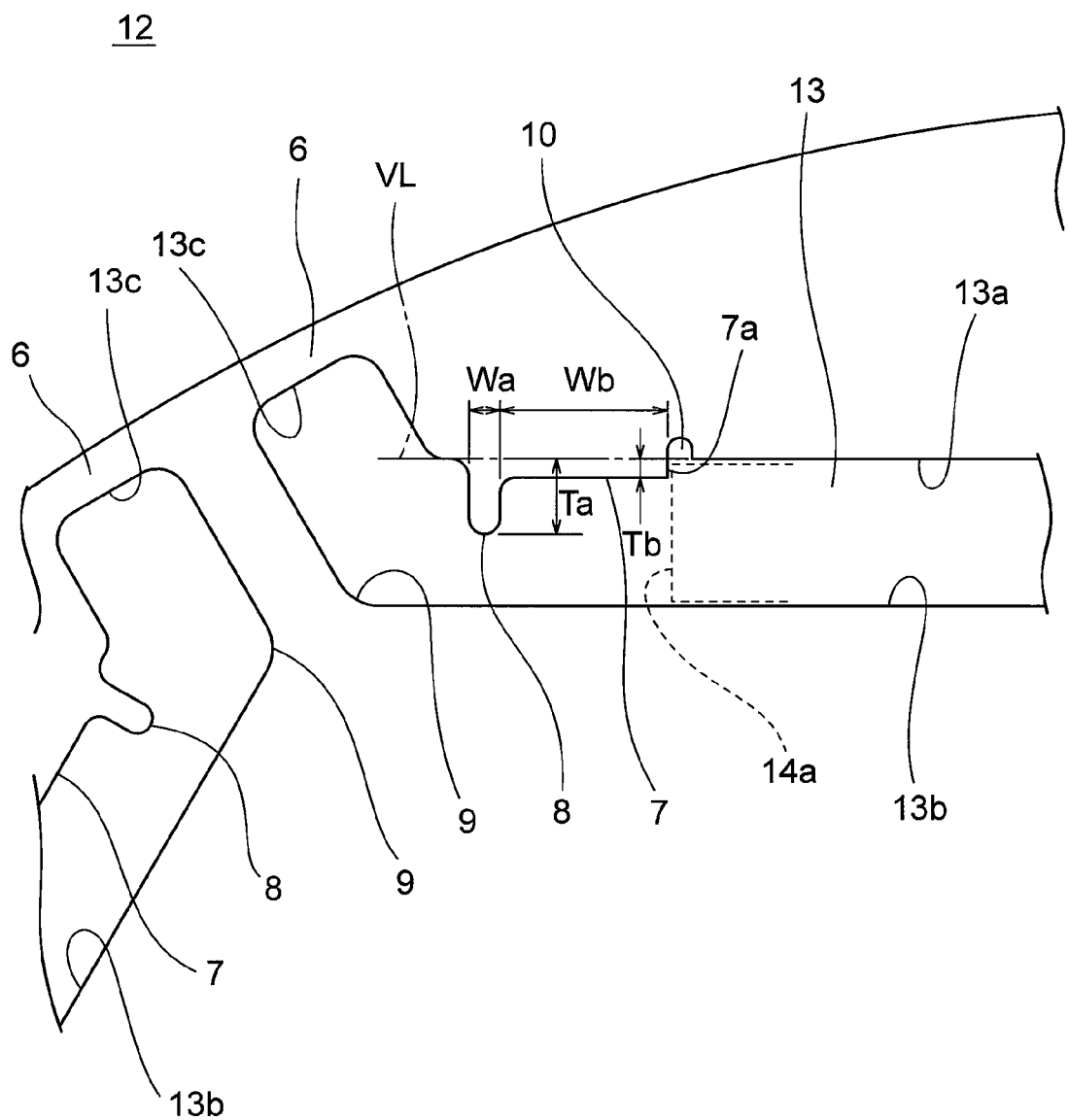
FIG. 3 is a partial enlarged view of the vicinity of an inter-pole portion of the rotator core illustrated in FIG. 2.
Figure 4:
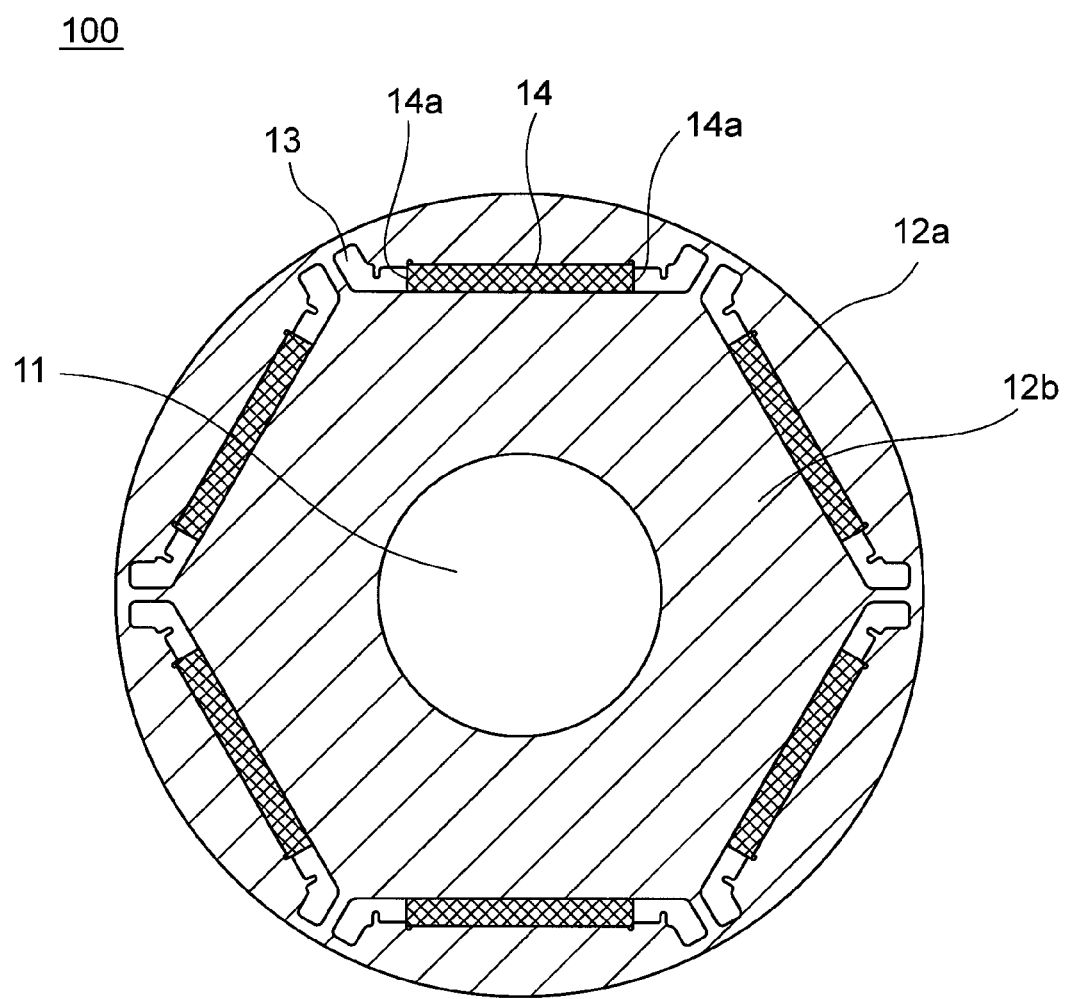
FIG. 4 is a cross-sectional view of a rotator having a rare-earth magnet accommodated in the rotator core of FIG. 2.

FIG. 1 is a cross-sectional view of an interior permanent magnet motor according to a first embodiment of the present invention, FIG. 2 is a cross-sectional view of a rotator core illustrated in FIG. 1, FIG. 3 is a partial enlarged view of the vicinity of an inter-pole portion of the rotator core illustrated in FIG. 2, and FIG. 4 is a cross-sectional view of a rotator having a Nd.Fe.B rare-earth magnet accommodated in the rotator core of FIG. 2. Note that, the drawing sheets of FIG. 1 to FIG. 4 are each a surface having, as the normal, a rotary shaft of a rotator described later. Moreover, in FIG. 3, the clarity of the illustrated lines for description has priority, and hatching is omitted (FIG. 5, FIG. 7, and FIG. 9 referred to later have the same purpose).

In FIG. 1, an interior permanent magnet motor 50 according to the embodiment of the present invention includes a stator 1 having an annular shape and a rotator 100. The stator 1 includes a stator core 2 having a circular shape, a plurality of slots 3 formed in an inner peripheral portion of the stator core 2 at equiangular pitches in a circumferential direction (a direction of a circle having a rotary shaft of the rotator as the center on a surface having the rotary shaft as the normal; a direction of a rotation locus of the rotator 100), and a coil 4 accommodated in each of the slots 3.

The rotator 100 is arranged on the inner peripheral side of the stator 1 so as to be rotatable. An air gap 5 having a cylindrical shape is formed between an outer peripheral surface 15 of the rotator 100 (rotator core 12) and an inner peripheral surface 1a of the stator 1. Note that, the stator 1 illustrated in FIG. 1 is a distributed winding stator as an example, but the stator 1 may be a concentrated winding stator.

Meanwhile, the rotator 100 includes, as a main configuration thereof, a rotary shaft 11, the rotator core 12, and a plurality of permanent magnets 14. Rotational energy is transmitted from a drive source to the rotary shaft 11, and the rotator core 12 arranged around the rotary shaft 11 is rotated by the rotational energy. The rotator core 12 and the rotary shaft 11 are coupled to each other by, for example, shrink fitting and press fitting.

Further, the details of the rotator are described with reference to FIG. 2 and FIG. 3. FIG. 2 and FIG. 3 are each an illustration of the rotator core 12 before the permanent magnet 14 is accommodated therein. The rotator core 12 is manufactured by laminating, in an extending direction of the rotary shaft 11 (the front-back direction of the drawing sheet of FIG. 2), a plurality of silicon steel sheets (constituent sheets) each punched out into a predetermined shape with a die. The outer peripheral surface 15 of the rotator core 12 is formed into a cylindrical shape.

Six magnet accommodating holes 13 are formed in the rotator core 12 along a circumferential direction. The six magnet accommodating holes 13 have the same shape. Moreover, each of the six magnet accommodating holes 13 is expanded over an equal angular range, and radial positions of respective portions of the magnet accommodating holes 13 are also in the same mode for the six magnet accommodating holes 13.

Each of the magnet accommodating holes 13 includes an outer defining line 13a, an inner defining line 13b, and a pair of end lines 13c in a radial direction (a direction of a radius having the rotary shaft of the rotator as the center on the surface having the rotary shaft as the normal) on the drawing sheet of FIG. 2. The pair of end lines 13c connects end portions of the outer defining line 13a and end portions of the inner defining line 13b to each other in the vicinity of the outer peripheral surface 15 of the rotator core 12.

The rotator core 12 includes an outer peripheral thin core portion 6 between the outer peripheral surface 15 of the rotator core 12 and each of the end lines 13c of each of the magnet accommodating holes 13.

With the configuration of the rotator core 12 as described above, a magnetic resistance in the vicinity of the both end portions (end lines 13c) of the magnet accommodating hole 13 can be increased. Accordingly, a short-circuit flux of the magnet can be reduced and a higher torque can thus be realized.

At the both ends of the outer defining line 13a of each of the magnet accommodating holes 13, a pair of minute projecting portions 7, a pair of large projecting portions 8, and a pair of demagnetizing field recesses 10 are formed. The pair of minute projecting portions 7 is protruded radially inward. Those minute projecting portions 7 have a positioning function of preventing the permanent magnet 14 from deviating in the circumferential direction, and a function of inhibiting the demagnetizing field generated by the winding of the stator 1 from passing through the corner portion of the permanent magnet 14.

A height of the minute projecting portion 7 is set to ensure such a dimension that allows, when the permanent magnet 14 is inserted, surface contact between an end surface 14a of the permanent magnet 14 in a longitudinal direction thereof and a side surface 7a of the minute projecting portion 7. It is only required to ensure the surface-contact portion having a dimension capable of preventing the deviation of the permanent magnet 14 at a lower limit of a dimensional tolerance of the permanent magnet 14. In this example, the height of the minute projecting portion 7 is approximately 0.5 mm.

Further, the large projecting portion 8 is formed at the outer defining line 13a on the outer side of the minute projecting portion 7 (side away from permanent magnet 14; end line 13c side; inter-pole portion side). The large projecting portion 8 is extended to the inner defining line 13b side of the magnet accommodating hole 13. As an example, in the first embodiment, the large projecting portion 8 is extended toward the inner defining line 13b so as to be orthogonal to the inner defining line 13b.

The minute projecting portion 7 and the large projecting portion 8 are continuously formed to form an integral structure, and form a two-step structure.

In this case, Tb<Ta and Wa<Wb are established in the configuration, where Ta represents a height dimension of the large projecting portion 8, Tb represents the height dimension of the minute projecting portion 7, Wa represents a width of the large projecting portion 8 in the magnet longitudinal direction, and Wb represents a width of the minute projecting portion in the magnet longitudinal direction. Note that, as illustrated in FIG. 3, the height dimension Ta of the large projecting portion 8 and the height dimension Tb of the minute projecting portion 7 are dimensions from a virtual extension line VL of the outer defining line 13a of the magnet accommodating hole 13 in the cross-sectional view of FIG. 3.

On the inner side (pole center side) of the minute projecting portion 7, the demagnetizing field relief groove 10, which is adjacent to the minute projecting portion 7 and has a cross-sectional shape protruding radially outward, is formed. In other words, the demagnetizing field recess 10 is recessed, in the cross-sectional view of FIG. 3, to the radially outer side with respect to the virtual extension line VL of the outer defining line 13a. Due to the presence of the demagnetizing field recess 10, in a state in which the permanent magnet 14 is accommodated in the magnet accommodating hole 13, non-contact space between the permanent magnet 14 and the outer defining line 13a of the magnet accommodating hole 13 is ensured at the corner portions of the both ends of the permanent magnet 14 on the radially outer side.

With the demagnetizing field recess 10 formed as described above, a magnetic flux generated by the winding of the stator 1 passes not through the corner portion of the permanent magnet 14 but through the minute projecting portion 7, and hence the demagnetization resistance of the corner portion of the permanent magnet 14 can be improved.

The inner defining line 13b has a linear shape without any projecting structure, and is connected to the corresponding end line 13c having a rough U shape via a bended portion 9 on the outer diameter side near the inter-pole portion.

FIG. 4 is a cross-sectional view of the rotator core of FIG. 2 that has a rare-earth magnet accommodated therein. As illustrated in FIG. 4, the corresponding permanent magnet 14 is accommodated in each of the magnet accommodating holes 13. That is, the permanent magnets 14 forming the magnetic poles of the rotator core 12 are arranged as many as the number of poles in the circumferential direction of the rotator core 12, and are magnetized so that the N pole and the S pole are alternately positioned.

Moreover, the permanent magnet 14 is a Nd.Fe.B rare-earth magnet having a residual flux density of 1.2 T or more at normal temperature and J coercive force of less than 23 kOe at normal temperature. The shape of the magnet is a flat plate shape, and the permanent magnet 14 is arranged so as to be sandwiched by the pair of minute projecting portions 7.

Figure 5:
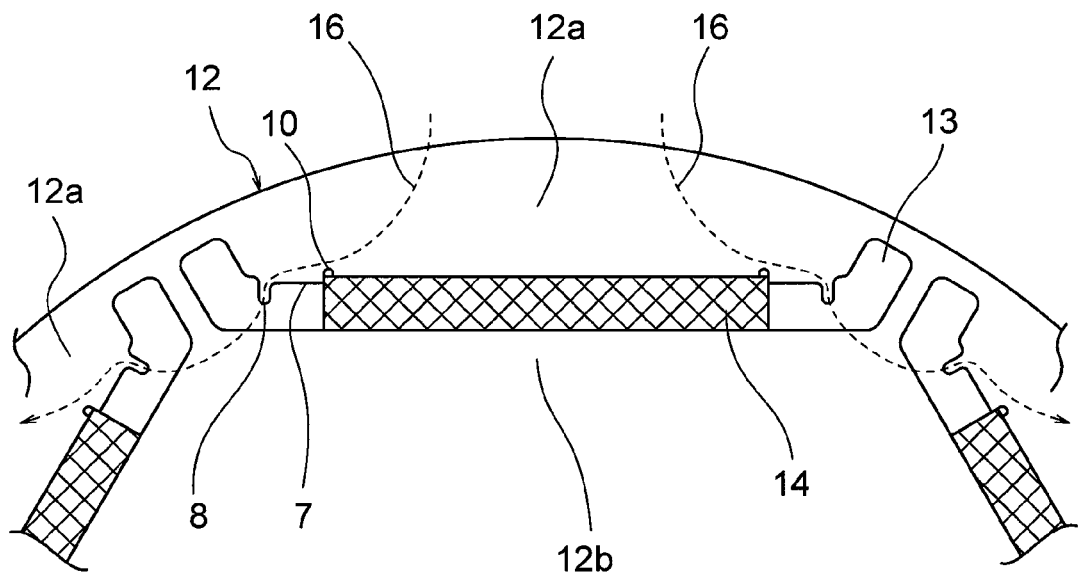
FIG. 5 is a conceptual view for illustrating a flow of a magnetic flux due to a demagnetizing field.

FIG. 5 is a conceptual view for illustrating a flow of a magnetic flux generated by the stator winding when a large current flows through the stator winding. In the magnet accommodating hole 13, the minute projecting portion 7, the large projecting portion 8, and the demagnetizing field recess 10 are formed as described above. Thus, as illustrated in FIG. 5, in the rotator core 12, a magnetic flux 16 passes through an outer core portion 12a on the radially outer side of the magnet accommodating hole 13, flows into the large projecting portion 8 via the minute projecting portion 7 while avoiding the corner portion of the permanent magnet 14 on the radially outer side, and passes, from the large projecting portion 8, through an inner core portion 12b on the radially inner side of the magnet accommodating hole 13.

As described above, according to the interior permanent magnet motor of the first embodiment, the demagnetizing field generated by the stator winding can be guided to the large projecting portion while reliably positioning the magnet by the minute projecting portion. Therefore, while suppressing an unintended movement of the permanent magnet, the demagnetization at the corner portion of the permanent magnet can be suppressed, to thereby provide an electric motor with a small reduction in torque. Moreover, a usage amount of Dy contained in the rare-earth magnet can be reduced, to thereby obtain a cost reduction effect. Further, the reduction in usage amount of Dy leads to an increase in residual flux density of the magnet, to thereby realize higher torque.

Second Embodiment

Next, with reference to FIG. 6 to FIG. 9, an interior permanent magnet motor according to a second embodiment of the present invention is described. FIG. 6, FIG. 7, FIG. 8, and FIG. 9 are views relating to the second embodiment and are in the same modes as FIG. 2, FIG. 3, FIG. 4, and FIG. 5, respectively.

A rotator core 112 in an interior permanent magnet motor 50 according to the second embodiment is also manufactured by laminating, in an extending direction of the rotary shaft 11 (the front-back direction of the drawing sheet of FIG. 2), a plurality of silicon steel sheets (constituent sheets) each punched out into a predetermined shape with a die. The outer peripheral surface 15 of the rotator core 112 is formed into a cylindrical shape.

Six magnet accommodating holes 113 are formed in the rotator core 112 along a circumferential direction. The six magnet accommodating holes 113 have the same shape. Moreover, each of the six magnet accommodating holes 113 is expanded over an equal angular range, and radial positions of respective portions of the magnet accommodating holes 113 are also in the same mode for the six magnet accommodating holes 113.

Figure 6:
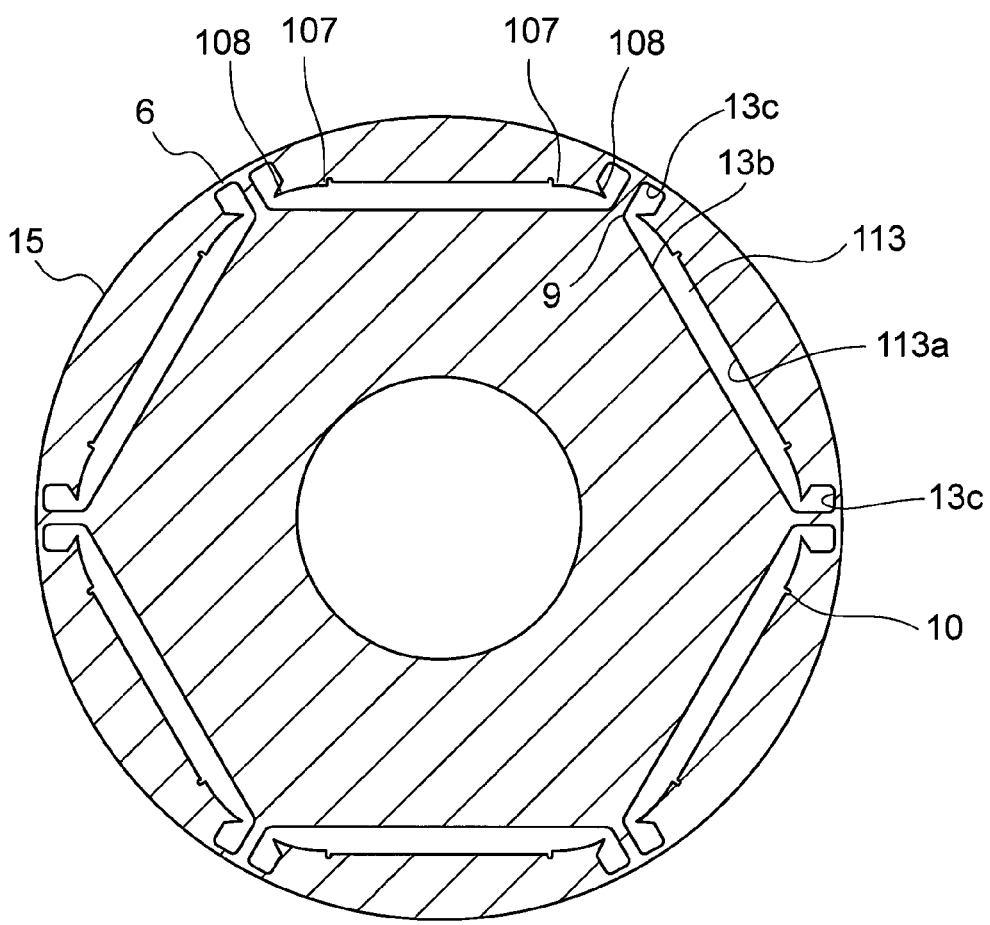
FIG. 6 is a view in the same mode as FIG. 2 according to a second embodiment of the present invention.
Figure 7:
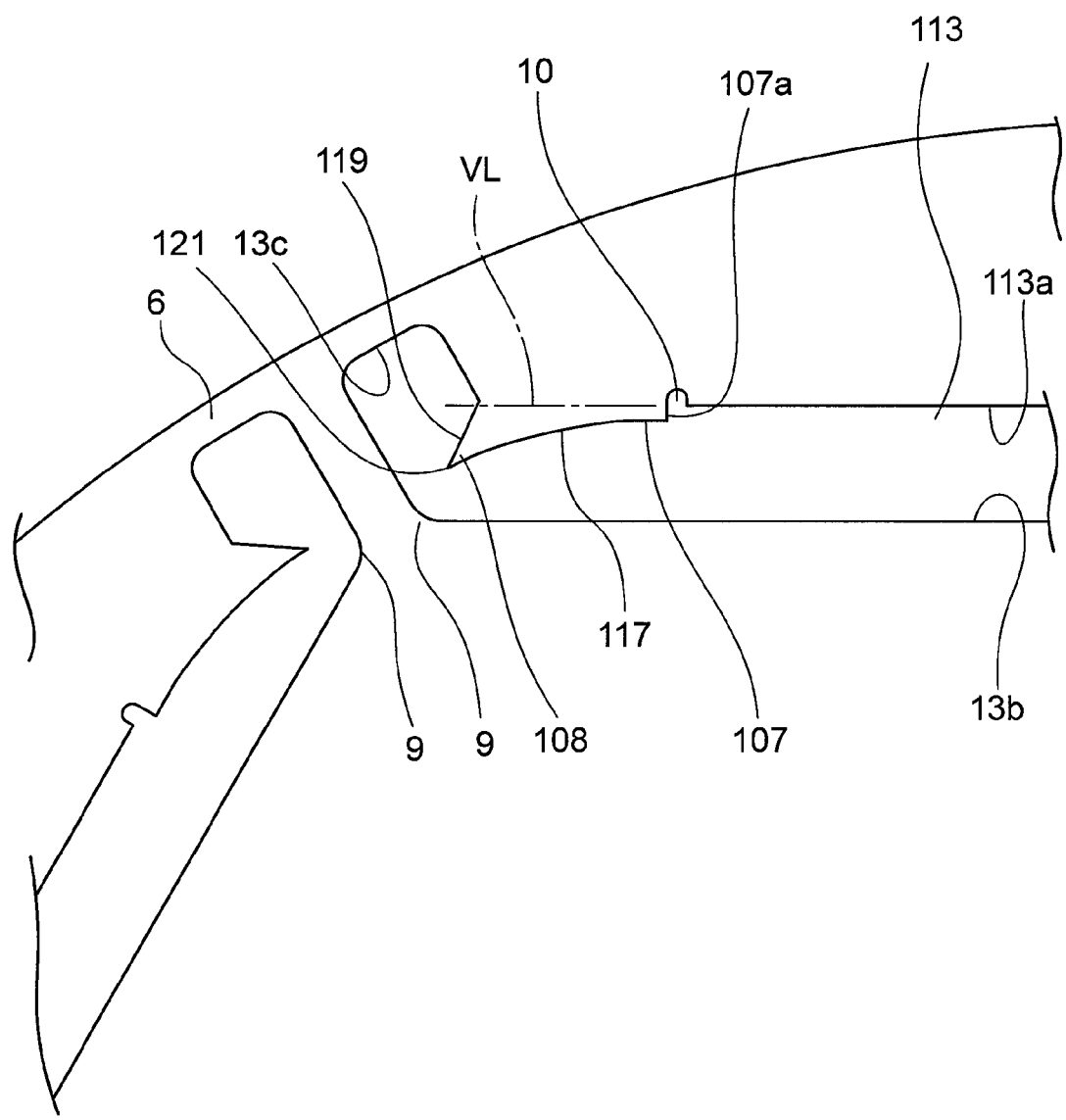
FIG. 7 is a view in the same mode as FIG. 3 according to the second embodiment.

Each of the magnet accommodating holes 113 includes, on the drawing sheets of FIG. 6 and FIG. 7, an outer defining line 113a, the inner defining line 13b, and the pair of end lines 13c connecting end portions of the outer defining line 113a and the end portions of the inner defining line 13b to each other in the vicinity of the outer peripheral surface 15 of the rotator core 112.

The rotator core 112 includes the outer peripheral thin core portion 6 between the outer peripheral surface 15 of the rotator core 112 and each of the end lines 13c of each of the magnet accommodating holes 113.

With the configuration of the rotator core 112 as described above, a magnetic resistance in the vicinity of the both end portions (end lines 13c) of the magnet accommodating hole 113 can be increased. Accordingly, a short-circuit flux of the magnet can be reduced and a higher torque can thus be realized.

As clearly illustrated particularly in FIG. 7, at the outer defining line 113a, a minute projecting portions 107 protruded radially inward is formed. The minute projecting portion 107 has a positioning function of preventing the permanent magnet 14 from deviating in the circumferential direction, and a function of inhibiting the demagnetizing field generated by the winding of the stator 1 from passing through the corner portion of the permanent magnet 14.

A height of the minute projecting portion 107 is set to ensure such a dimension that allows, when the permanent magnet 14 is inserted, surface contact between an end surface 14a of the permanent magnet 14 in a longitudinal direction and a side surface 107a of the minute projecting portion 107. It is only required to ensure the surface-contact portion having a dimension capable of preventing the deviation of the permanent magnet 14 at a lower limit of a dimensional tolerance of the magnet. In this example, the height of the side surface of the minute projecting portion 107 is approximately 0.5 mm.

Further, a large projecting portion 108 is formed at the outer defining line 113a on the outer side of the minute projecting portion 107 (side away from permanent magnet 14; end line 13c side; inter-pole portion side). The large projecting portion 108 is extended to the inner defining line 13b side of the magnet accommodating hole 113.

The minute projecting portion 107 and the large projecting portion 108 are continuously formed to form an integral structure, and are connected to each other by a continuous smooth line. The integral structure of the minute projecting portion 107 and the large projecting portion 108 is protruded, as a whole, from the virtual extension line VL of the outer defining line 113a of the magnet accommodating hole 113 to the inner defining line 13b side. Moreover, an outline of the integral structure of the minute projecting portion 107 and the large projecting portion 108 is formed by, in the cross-sectional view of FIG. 7, the side surface 107a, a first inclined line 117, a second inclined line 119, and a most projecting end portion 121.

The first inclined line 117 is inclined in a direction in which a height dimension thereof is gradually increased from the pole center side toward the inter-pole side. The second inclined line 119 is positioned on the end line 13c side of the first inclined line 117 and is inclined in a direction to approach the inter-pole side as approaching the inner defining line 13b. The most projecting end portion 121, which serves as a boundary between the first inclined line 117 and the second inclined line 119, is sharpened to form an acute angle and is directed to the vicinity of the bended portion 9.

On the inner side (pole center side) of the minute projecting portion 107, the demagnetizing field relief groove 10, which is adjacent to the minute projecting portion 107 and has a cross-sectional shape protruding radially outward, is formed. Due to the presence of the demagnetizing field recess 10, in a state in which the permanent magnet 14 is accommodated in the magnet accommodating hole 113, non-contact space between the permanent magnet 14 and the outer defining line 13a of the magnet accommodating hole 113 is ensured at the corner portions of the both ends of the permanent magnet 14 on the radially outer side.

With the demagnetizing field recess 10 formed as described above, a magnetic flux generated by the winding of the stator 1 passes not through the corner portion of the permanent magnet 14 but through the minute projecting portion 107, and hence the demagnetization resistance of the corner portion of the permanent magnet 14 can be improved.

Figure 8:
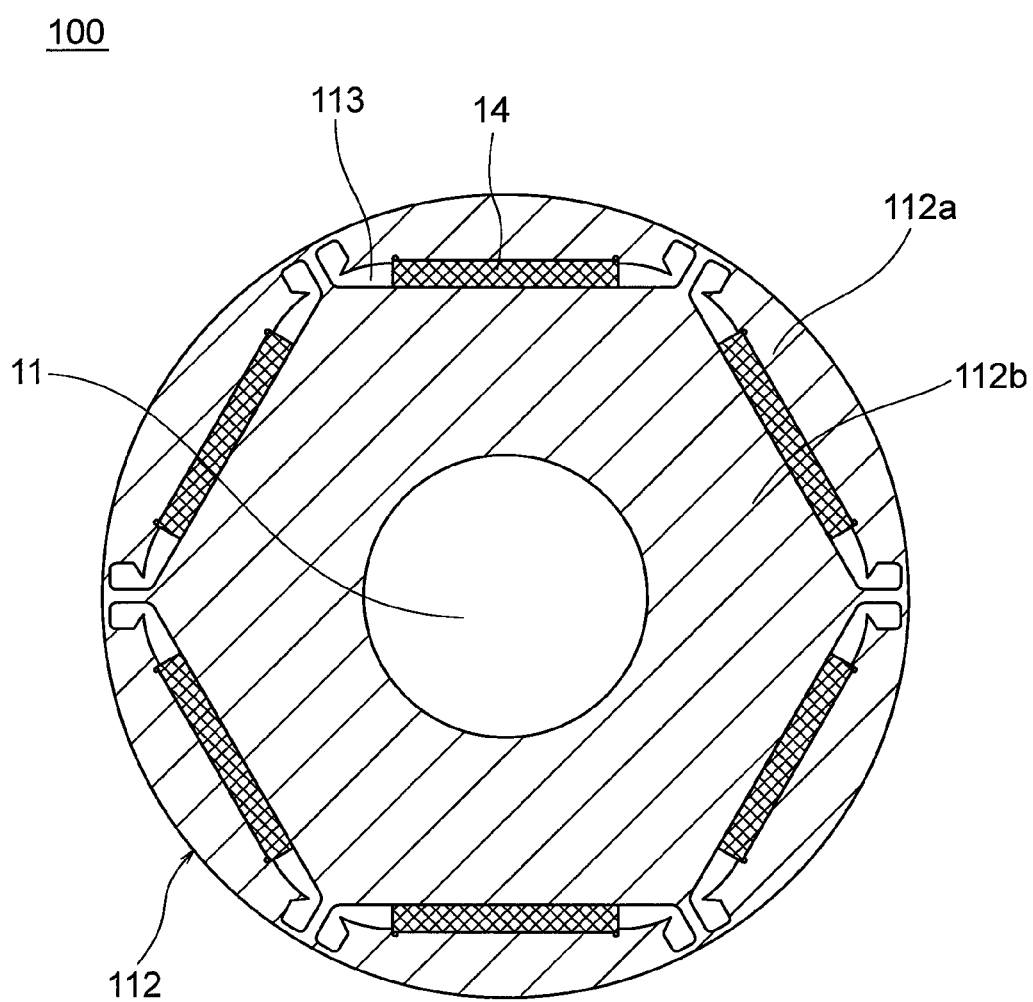
FIG. 8 is a view in the same mode as FIG. 4 according to the second embodiment.

As illustrated in FIG. 8, the corresponding permanent magnet 14 is accommodated in each of the magnet accommodating holes 113. That is, the permanent magnets 14 forming the magnetic poles of the rotator core 112 are arranged as many as the number of poles in the circumferential direction of the rotator core 112, and are magnetized so that the N pole and the S pole are alternately positioned.

Figure 9:
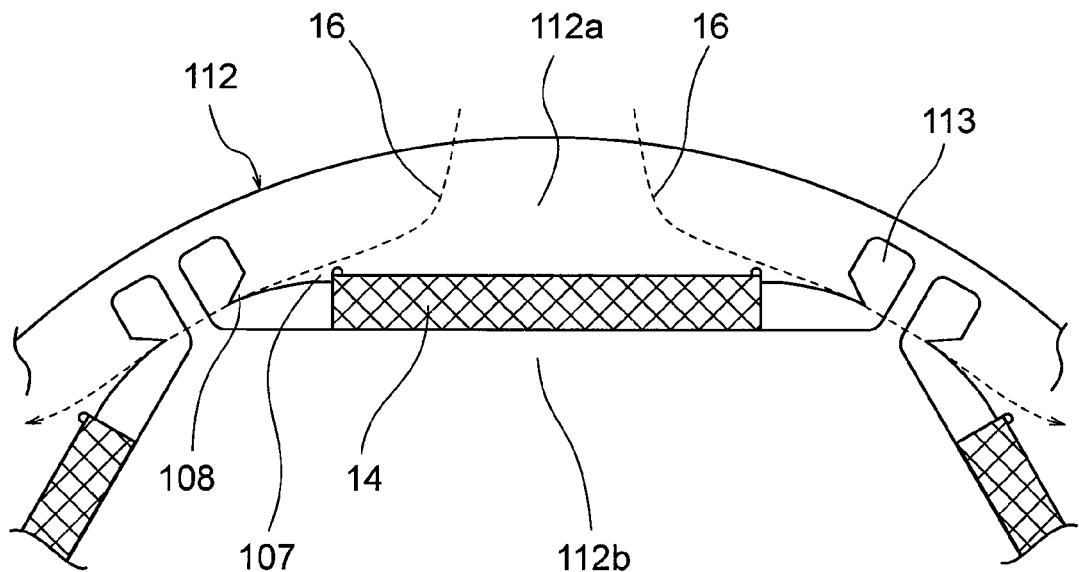
FIG. 9 is a view in the same mode as FIG. 5 according to the second embodiment.

Moreover, in the magnet accommodating hole 113, the minute projecting portion 107, the large projecting portion 108, and the demagnetizing field recess 10 are formed as described above. Thus, as illustrated in FIG. 9, in the rotator core 112, the magnetic flux 16 passes through an outer core portion 112a on the radially outer side of the magnet accommodating hole 113, flows into the large projecting portion 108 via the minute projecting portion 107 while avoiding the corner portion of the permanent magnet 14 on the radially outer side, and passes, from the large projecting portion 108, through an inner core portion 112b on the radially inner side of the magnet accommodating hole 113.

Moreover, the second embodiment is similar to the above-mentioned first embodiment in a part that is not specifically described above.

Also according to the second embodiment configured as described above, the similar advantage to the above-mentioned first embodiment can be obtained, and the demagnetizing field generated by the stator winding can be guided to the large projecting portion while reliably positioning the magnet by the minute projecting portion. Therefore, while suppressing an unintended movement of the permanent magnet, the demagnetization at the corner portion of the permanent magnet can be suppressed, to thereby provide an electric motor with a small reduction in torque. Moreover, a usage amount of Dy contained in the rare-earth magnet can be reduced, to thereby obtain a cost reduction effect. Further, the reduction in usage amount of Dy leads to an increase in residual flux density of the magnet, to thereby realize higher torque.

In addition, in the second embodiment, the minute projecting portion and the large projecting portion are continuously formed to form the integral structure having the simpler shape, and are connected to each other by the continuous curve. Thus, a punching property of a silicon steel sheet when being punched out by a press machine is better.

Third Embodiment

Next, as a third embodiment of the present invention, a cylinder rotary compressor having the above-mentioned interior permanent magnet motor mounted therein is described. Note that, the present invention includes the compressor having the interior permanent magnet motor of one of the above-mentioned first and second embodiments mounted therein, but the type of the compressor is not limited to a rotary compressor.

Figure 10:
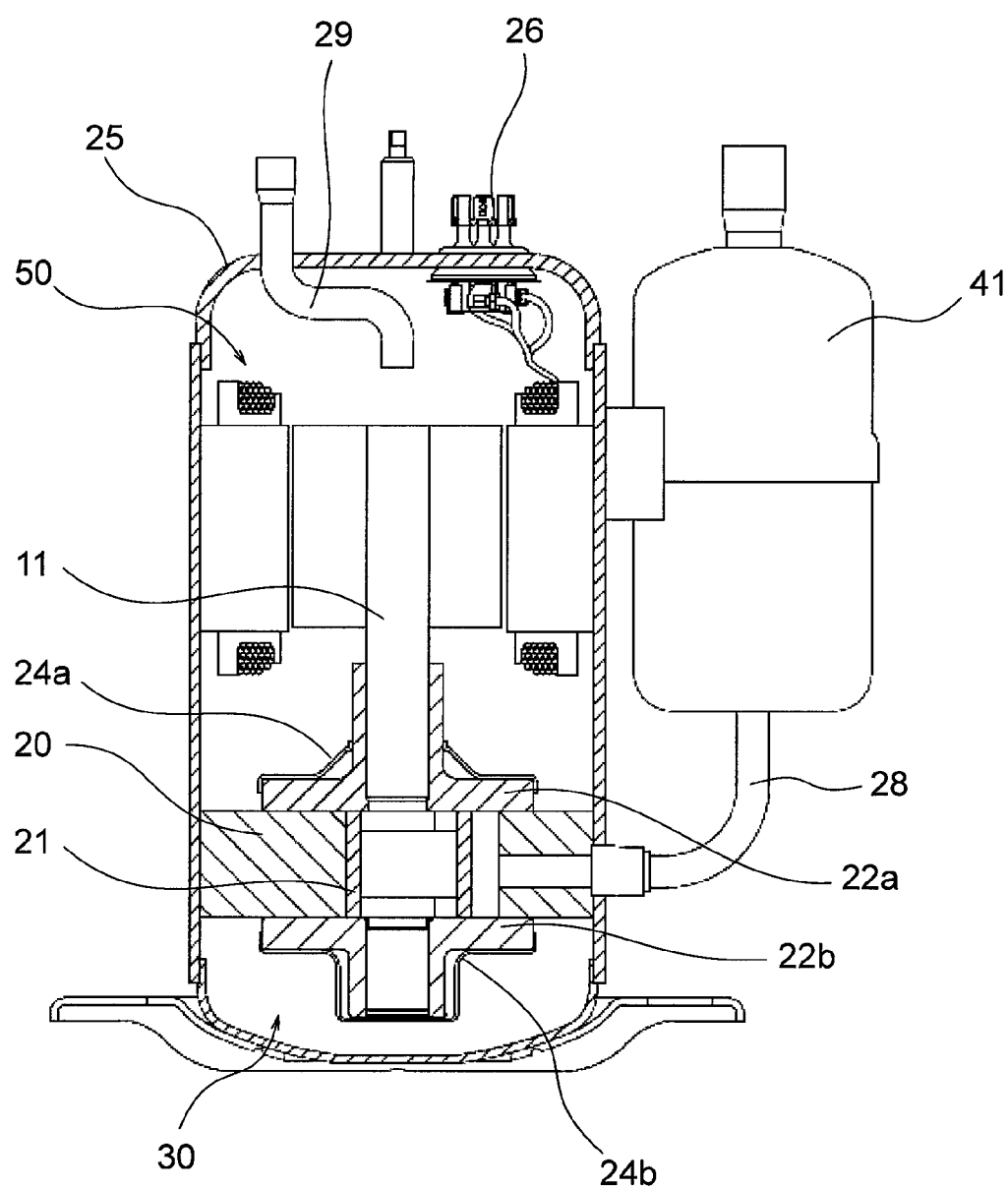
FIG. 10 is a longitudinal sectional view of a cylinder rotary compressor having an interior permanent magnet motor mounted therein according to a third embodiment of the present invention.

FIG. 10 is a longitudinal sectional view of the cylinder rotary compressor having the interior permanent magnet motor mounted therein. A cylinder rotary compressor 200 includes the interior permanent magnet motor 50 (motor element) and a compression element 30 in a hermetically-sealed container 25. Although not illustrated, at a bottom portion of the hermetically-sealed container 25, a refrigerant oil for lubricating each of sliding portions of the compression element 30 is stored.

The compression element 30 includes, as main components thereof, a cylinder 20 arranged in a vertically stacked state, the rotary shaft 11 rotated by the motor, a piston 21 to be fitted by insertion into the rotary shaft 11, a vane (not shown) dividing an inside of the cylinder 20 into an intake side and a compression side, an upper frame 22a and a lower frame 22b being a pair of upper and lower frames into which the rotary shaft 11 is to be rotatably fitted by insertion, for closing axial end surfaces of the cylinder 20, and mufflers 24a and 24b mounted on the upper frame 22a and the lower frame 22b, respectively.

The stator 1 of the interior permanent magnet motor 50 is directly fixed to the hermetically-sealed container 25 by a method such as shrink fitting or welding and is held thereby. The coil 4 of the stator 1 is supplied with power from a glass terminal 26 fixed to the hermetically-sealed container 25.

The rotor 100 is arranged with an air gap secured on the inner diameter side of the stator 1, and is held in a rotatable state by the bearing portions (upper frame 22a and lower frame 22b) of the compression element 30 arranged at the lower part of the cylinder rotary compressor 200 via the rotary shaft 11 in the center portion of the rotor 100.

Next, an operation of the cylinder rotary compressor 200 is described. A refrigerant gas supplied from an accumulator 41 is taken into the cylinder 20 through an intake pipe 28 fixed to the hermetically-sealed container 25. The interior permanent magnet motor 50 is rotated by energization of an inverter so that the piston 21 fitted to the rotary shaft 11 is rotated in the cylinder 20. With this, the coolant is compressed in the cylinder 20. The compressed coolant having high temperature passes through the mufflers 24a and 24b, and then passes through air holes of the interior permanent magnet motor 50 and the like to rise in the hermetically-sealed container 25. In this manner, the compressed coolant is supplied to a high-pressure side of the refrigeration cycle through a discharge pipe 29 provided to the hermetically-sealed container 25.

Note that, as the coolant for the cylinder rotary compressor 200, hitherto known R410A, R407C, R22, or the like is used, but any coolant such as a coolant having a low global warming potential (GWP) can also be applied. In view of the prevention of global warming, a low GWP coolant is desirable. As typical examples of the low GWP coolant, the following coolants are given.

(1) A halogenated hydrocarbon having in its composition a carbon-carbon double bond, such as HFO-1234yf (CF3CF=CH2). HFO is an abbreviation of the term "hydro-fluoro-olefin", and the olefin refers to an unsaturated hydrocarbon having one double bond. Note that, the GWP of HFO-1234yf is 4.

(2) A hydrocarbon having in its composition a carbon-carbon double bond, such as R1270 (propylene). Note that, the GWP of R1270 is 3, which is smaller than that of HFO-1234yf, and the combustibility of R1270 is higher than that of HFO-1234yf.

(3) A mixture containing at least any one of a halogenated hydrocarbon having in its composition a carbon-carbon double bond or a hydrocarbon having in its composition a carbon-carbon double bond, such as a mixture of HFO-1234yf and R32. HFO-1234yf causes a large pressure loss because HFO-1234yf is a low-pressure refrigerant. Thus, the performance of the refrigeration cycle (particularly in an evaporator) is liable to deteriorate. Accordingly, a mixture of HFO-1234yf and R32, R41, or the like, which is a higher-pressure refrigerant than HFO-1234yf, is promising in practical use.

Among the above-mentioned low GWP coolants, the R32 coolant is neither toxic nor highly flammable, and thus particularly attracts attention. Moreover, when the R32 coolant is used for the cylinder rotary compressor 200, such a characteristic is provided that, as compared to using the hitherto used R410A, R4070, R22, or the like, an internal temperature of the cylinder rotary compressor 200 is increased by approximately 20° C. or more.

The internal temperature of the cylinder rotary compressor 200 changes depending on compression load states (rotational speed; compression load torque; coolant), and the temperature particularly has high dependence on the rotational speed in a steady state in which the temperature is stable. For example, when the R410 coolant is used, a rise in internal temperature of the cylinder rotary compressor with respect to the rotational speed is 50° C. to 60° C. at low speed driving, is 70° C. to 80° C. at intermediate speed driving, and is 90° C. to 110° C. at high speed driving. Accordingly, such a characteristic is provided that the internal temperature of the cylinder rotary compressor 200 is increased as the rotational speed of the cylinder rotary compressor 200 is increased. When the R32 coolant is used, as compared to using the R410A coolant, the internal temperature of the cylinder rotary compressor 200 is further increased by approximately 20° C.

In the cylinder rotary compressor having the configuration described above, the interior permanent magnet motor having the large demagnetization resistance is used. Thus, such an effect is provided that it is possible to provide a highly reliable compressor in which, even when J coercive force is reduced due to a rise in temperature of the compressor, demagnetization of the magnet does not occur. Moreover, even when the interior permanent magnet motor is operated in a high temperature atmosphere of the cylinder rotary compressor, the residual flux density of the magnet can be increased to increase the torque of the electric motor while reducing the usage amount of Dy added to the rare-earth magnet to achieve a lower cost. Thus, it is possible to provide a compressor with high efficiency.

Note that, the embodiments of the present invention are examples of the details of the present invention, and may be combined with further another publicly known art or may be changed such as partially omitted within a range that does not depart from the gist of the present invention.

REFERENCE SIGNS LIST 1 stator, 10 demagnetizing field recess, 12, 112 rotator core, 13, 113 magnet accommodating hole, 13a, 113a outer defining line, 13b inner defining line, 14 permanent magnet, 25 hermetically-sealed container, 50 interior permanent magnet motor, 100 rotator, 200 cylinder rotary compressor

The invention claimed is:

1. An interior permanent magnet motor, comprising:
a rotator;
a stator arranged so as to be opposed to the rotator across an air gap; and
a plurality of permanent magnets respectively inserted into a plurality of magnet accommodating holes formed in a rotator core of the rotator,
wherein at both ends of an outer defining line of each of the magnet accommodating holes, a pair of minute projecting portions, a pair of large projecting portions, and a pair of demagnetizing field recesses are formed,
wherein each of the permanent magnets is arranged so as to be sandwiched by a corresponding pair of minute projecting portions,
wherein each of the minute projecting portions is protruded radially inward to be in surface-contact with a corresponding end surface of the permanent magnet inserted into the magnet accommodating hole,
wherein each of the large projecting portions is formed on an outer side of a corresponding minute projecting portion, and is extended to an inner defining line side of the magnet accommodating hole, and
wherein the large projecting portions and the minute projecting portions are formed so that Tb<Ta is established, where Ta represents a height dimension of the large projecting portion and Tb represents a height dimension of the minute projecting portion.

2. An interior permanent magnet motor according to claim 1, wherein the minute projecting portion and the large projecting portion are continuously formed to form an integral structure.

3. An interior permanent magnet motor according to claim 1, wherein the minute projecting portion and the large projecting portion form a two-step structure.

4. An interior permanent magnet motor according to claim 1, wherein the large projecting portions and the minute projecting portions are formed so that Wa<Wb is established, where Wa represents a width of the large projecting portion in a magnet longitudinal direction and Wb represents a width of the minute projecting portion in the magnet longitudinal direction.

5. An interior permanent magnet motor according to claim 1,
wherein the minute projecting portion and the large projecting portion are continuously formed to form an integral structure,
wherein an outline of the integral structure of the minute projecting portion and the large projecting portion is formed by a side surface, a first inclined line, a second inclined line, and a most projecting end portion, and
wherein the first inclined line is inclined in a direction in which a height dimension thereof is gradually increased from a pole center side to an inter-pole side.

6. An interior permanent magnet motor according to claim 1, wherein on an inner side of the minute projecting portion in the magnet accommodating hole, the demagnetizing field relief groove, which is adjacent to the minute projecting portion and has a cross-sectional shape protruding radially outward, is formed.

7. A compressor, comprising, in a hermetically-sealed container:
an electric motor; and
a compression element,
the electric motor comprising the interior permanent magnet motor of claim 1.

* * * * *